April 27, 1926.

H. L. BLOOD

CLUTCH SHIFTING MECHANISM

Original Filed March 29, 1921

1,582,666

INVENTOR
H. L. Blood.
BY
ATTORNEY

Patented Apr. 27, 1926.

1,582,666

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

CLUTCH-SHIFTING MECHANISM.

Original application filed March 29, 1921, Serial No. 456,545. Divided and this application filed April 6, 1923. Serial No. 630,300.

*To all whom it may concern:*

Be it known that I, HAROLD L. BLOOD, a citizen of the United States, residing at North Plainfield, in the county of Somerset and State of New Jersey, have invented certain new and useful Improvements in Clutch-Shifting Mechanism, of which the following is a specification.

This application is a division of my Patent No. 1,487,712 granted March 25, 1924 for feed mechanism for planers, and the invention herein relates particularly to an improved clutch shifting means which is particularly useful in such tool feeding mechanism.

The primary object of the invention is to provide an improved and simple clutch shifting mechanism adapted to yieldingly engage a clutch with its driver and to positively disengage the same therefrom.

Another object of the invention is to provide a clutch shifting mechanism including a rotary element provided with spring pressed means therein adapted to be compressed when the member is rotated to engage the clutch with its driver and to operate thereafter to yieldingly engage the clutch. Since the spring operates to automatically engage the clutch when the teeth thereon come into the engaging position, the operator is only required to throw the clutch shifting mechanism, the engaging operation being automatically performed by the spring. A further object of the invention is to provide a mechanism of the above type wherein a single spring pressed mechanism operates either to hold the clutch in its neutral position between a pair of driving elements or to yieldingly engage the same with either of such elements.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing.

Figure 1:
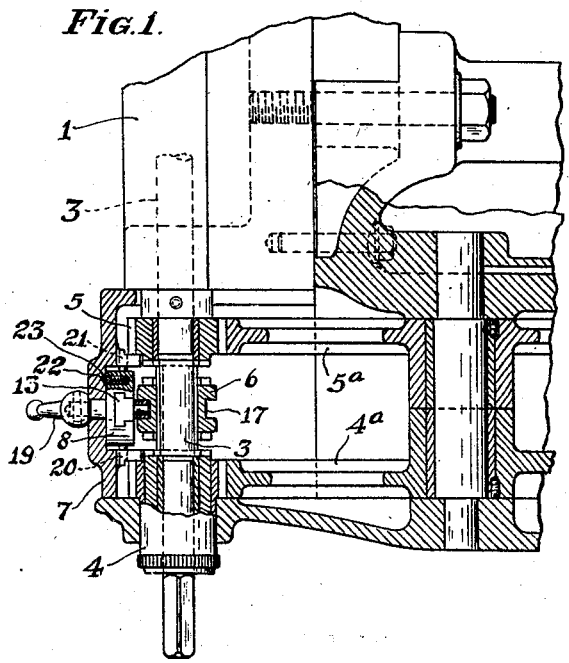
Figure 1 is a fragmentary plan sectional view of a planer tool feeding mechanism embodying my invention, such view being taken on line 1—1 of Fig. 2.
Figure 2:
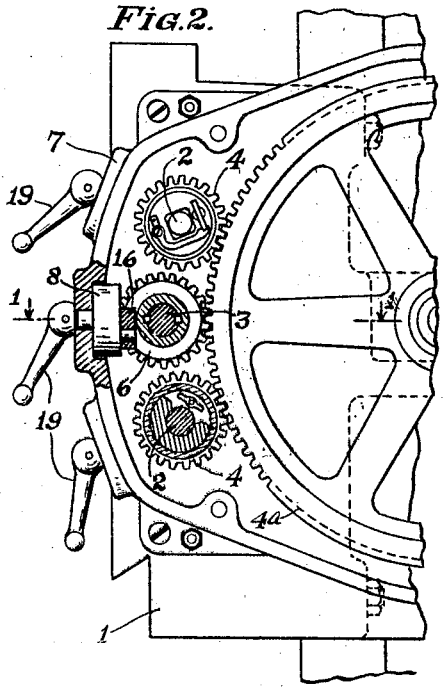
Fig. 2 is an end elevation thereof partly in section.

While my invention is herein shown in connection with a planer tool feeding mechanism and is particularly useful in such mechanism, it should be understood that the same is in no way limited to such use. In such mechanism, provision must be made for both feeding and traversing the tools both horizontally and vertically. To obtain such movements, a plurality of clutches are ordinarily required. Because of the number of clutches required and the limited space provided, it is essential that such clutches be as simple and compact as possible and also operate in a simple manner.

In the construction illustrated, each clutch is provided with a novel rotary clutch shifting member of simple design. Each of such members is provided with a block slidable therein and pivotally connected to the clutch, preferably through a second block extending into the clutch groove as illustrated. A spring normally forces the block outwardly of the member into engagement with a stop pin. The spring pressed mechanism performs various useful functions. When the clutch is in neutral, the expansion of the spring operates to hold the clutch in such position. When the clutch shifting member is rotated, the spring is compressed and operates to yieldingly engage the clutch. The operator is therefore only required to throw the member to the clutch engaging position and the spring automatically performs the engaging operation when the clutch teeth come into the meshing position. The member furthermore acts positively to withdraw the clutch when disengaging the same.

In the drawing, 1 indicates the cross rail of a planer adapted to slidably support a plurality of tool heads thereon as shown in my before-mentioned application. The tool heads are adapted to be moved along the cross rail by means of screw shafts 2 and the tools may be moved vertically by means of a feed shaft 3 in the usual manner. Loosely mounted on each shaft are two gears 4 and 5. Gear 4 is adapted to be oscillated by a gear segment 4ª and to therefore feed the tools intermittently and gear 5 is adapted to be rotated by a gear 5ª and to therefore traverse the tools continuously. A clutch member 6 splined on each shaft between the gears 4 and 5 is adapted to be engaged with either gear by means of cooperating clutch teeth on such elements.

Rotatably mounted on the housing 7 adjacent each clutch member is a rotary member 8 provided with a diametrically extending guideway 9 therein. Slidably mounted in the guideway is a block 10 counterbored at 11. A compression spring 12 extending into this counterbore and bearing against a block 13 secured to the member at one end of the guideway, normally forces the block 10 outwardly. A pin 14 limits the outward movement of the block 10. Integral on the inner face of block 10 is a pin 15 on which is seated a block 16 engaging in the groove 17 of the clutch member. The clutch member is thereby pivotally connected to the block 10.

Each clutch shifting member 8 is provided with a shank 18 extending through the housing 7 and having an operating handle 19 on its outer end. The members 8 may be rotated from such handles when shifting the clutches. A pair of stops 20 and 21 are provided for limiting the rotation of each member. It will be noted that the stops are adapted to be engaged by the block 13. Mounted in each member 8 is a spring-pressed ball 22 adapted to engage in any one of three depressions 23, 24 and 25. Engagement of the ball in depression 23 assists in holding the clutch in its neutral position. When the member 8 is rotated to engage its block 13 with the stop 20, the ball engages in the depression 24 and holds the member in such position. Likewise when the member 8 is rotated to engage its block 13 with the stop 21, the ball engages in the depression 25 and holds the member in such position.

Figure 3:
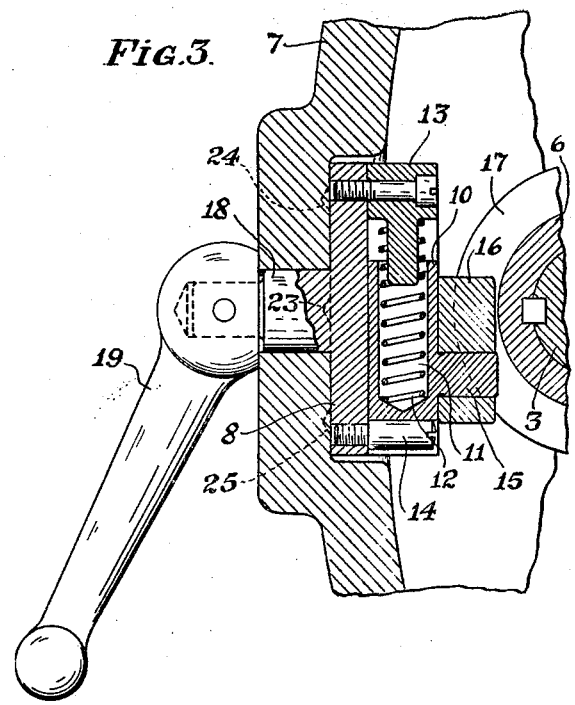
Fig. 3 is an enlarged vertical sectional view of my improved clutch shifting mechanism taken approximately on line 3—3 of Fig. 4.
Figure 4:
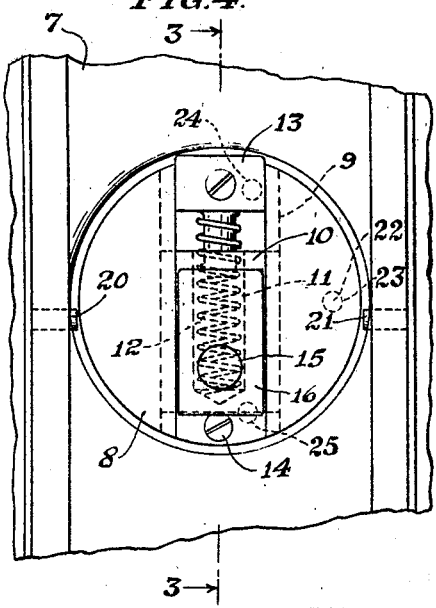
Fig. 4 is an inner face view thereof.

The operation of the mechanism is as follows: In all views of the drawing, the clutch is shown in the neutral position. In such position, the spring 12 is expanded and the clutch shifting parts assume the relative positions shown in Figs. 3 and 4. Since movement of the clutch member in either direction from the neutral position requires the compression of the spring, the clutch member will normally remain in the neutral position. In such position, it will be noted that the guideway 9 extends in a vertical direction. When it is desired to engage the clutch member with either gear 4 or 5, the operator grasps the handle 19 and rotates the member 8 until the block 13 engages one of the stops 20 or 21 whereupon the guideway 9 will be in a horizontal position. The member is held in such position by means of the ball 22 engaging in one or the other of depressions 24 and 25 as above stated. The rotation of the member 8 compresses the spring 12. The expansion of the spring acts to automatically engage the clutch member with the gear when their cooperating clutch teeth come into registry. The operator is therefore only required to throw the clutch shifting member 8 and is not required to hold such member until the clutch snaps into engagement. If desired, the operator may throw the clutch feeding members while the mechanism is at rest and when the mechanism starts to operate the clutches will automatically snap into engagement. It will be understood that such mechanism is particularly useful where a plurality of clutches are employed, as in the tool feeding mechanism illustrated.

What I claim is:

1. A clutch shifting mechanism comprising the combination of a rotary body portion, a member slidably mounted therein, a spring normally forcing the member in one direction, and a clutch engaging element connected to the member and adapted when the body portion is rotated in one direction to yieldingly engage the clutch element with its driver.

2. A clutch shifting mechanism comprising the combination of a rotary body portion having a radially extending guideway therein, a member slidably mounted in the guideway, spring means normally forcing the member outwardly, and a clutch engaging element pivoted to the member and adapted when the body portion is rotated in one direction to yieldingly engage the clutch element with its driver.

3. A clutch shifting mechanism comprising the combination of a rotary body portion having a radially extending guideway therein, a member slidably mounted in the guideway, spring means normally forcing the member outwardly, means limiting the outward movement of the member, and a clutch engaging element connected to the member and adapted when the body portion is rotated in one direction to yieldingly engage the clutch element with its driver.

4. In combination, a clutch member on a shaft between two driving elements and adapted by a movement in one direction or the other to respectively engage the elements with the shaft, a rotary member adjacent the clutch member, a block slidable therein and connected to the clutch member, and a spring normally operative to force the block in one direction in the member, the construction being such that the spring operates to yieldingly force the clutch member in the said one direction or the other.

5. In combination, a clutch member on a shaft between two gears, the clutch member serving to connect either gear with the shaft, a rotary member adjacent the clutch member, a block slidable therein and connected to the clutch member, and a spring normally operative to force the block outwardly, the construction being such that in one position of the member the spring engages the clutch member with one gear and in another position of the member the spring engages the clutch member with the other gear.

6. In combination, a clutch member mounted on a shaft between two elements, a rotary member adjacent the clutch member and having a radially extending guideway therein, a block slidable in the guideway, a spring normally urging the block radially outward, and a block pivoted to the first said block and engaging in a groove in the clutch member, the construction being such that as the rotary member is rotated one way or the other from a neutral position the spring is compressed and operates to engage the clutch member with one or the other respectively of the said elements.

7. In combination, a shaft, a gear loosely mounted thereon, a clutch member on the shaft adjacent the gear, a rotary member adjacent the clutch member, a block slidable therein and connected to the clutch member, and a spring normally operative to force the block outwardly of the member, the construction being such that with the clutch member in its neutral position the expanded spring operates to hold the clutch member in such position and when the member is rotated the spring is compressed and operates to engage the clutch member with the gear.

8. In combination, a clutch member mounted on a shaft between two gears, a rotary member adjacent the clutch member, a block slidable therein, a block pivoted to the first named block and engaging in a groove in the clutch member, and a spring normally operative to force the first named block outwardly of the member, the construction being such that, with the clutch member in its neutral position, the expanded spring operates to hold the clutch member in such position between the elements and when the member is rotated one way or the other the spring is compressed and operates to engage the clutch member with one or the other of the gears.

9. In combination, a clutch member mounted on a shaft between two gears, a rotary member adjacent the clutch member, a block slidable therein, a pivotal connection between the block and clutch member, and a spring normally operative to force the block outwardly of the member, the construction being such that rotation of the member operates to yieldingly engage the clutch member with the gears or to positively withdraw the same from engagement therewith.

In testimony whereof, I hereto affix my signature.

HAROLD L. BLOOD.